United States Patent
Soskind et al.

(10) Patent No.: US 7,286,743 B2
(45) Date of Patent: Oct. 23, 2007

(54) HIGH DYNAMIC RANGE INTEGRATED RECEIVER

(75) Inventors: Yakov G. Soskind, Plainsboro, NJ (US); James Douglas Struttman, Indialantic, FL (US); Jeffrey Zack, Melbourne, FL (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/444,223

(22) Filed: May 31, 2006

(65) Prior Publication Data

US 2006/0233498 A1    Oct. 19, 2006

Related U.S. Application Data

(60) Continuation-in-part of application No. 11/132,801, filed on May 19, 2005, now Pat. No. 7,068,890, which is a division of application No. 10/342,410, filed on Jan. 13, 2003, now Pat. No. 6,954,580.

(60) Provisional application No. 60/714,654, filed on Sep. 7, 2005, provisional application No. 60/360,937, filed on Mar. 1, 2002.

(51) Int. Cl.
    G02B 6/00    (2006.01)
    G02B 6/36    (2006.01)
(52) U.S. Cl. .................... 385/140; 385/92; 385/93
(58) Field of Classification Search ............ 385/14, 385/70, 92–94, 140; 257/184
See application file for complete search history.

(56) References Cited

U.S. PATENT DOCUMENTS

| | | | |
|---|---|---|---|
| 4,212,536 A * | 7/1980 | Bencze et al. | 356/71 |
| 4,591,231 A | 5/1986 | Kaiser et al. | 350/96.18 |
| 4,904,044 A | 2/1990 | Tamulevich | 350/96.18 |
| 5,087,122 A | 2/1992 | Ostrander et al. | 356/73.1 |
| 5,202,784 A | 4/1993 | Reddersen | 359/196 |
| 5,307,184 A | 4/1994 | Nishiwaki et al. | 359/30 |
| 5,325,459 A | 6/1994 | Schmidt | 385/140 |
| 5,383,199 A * | 1/1995 | Laudenslager et al. | 372/25 |
| 5,605,415 A | 2/1997 | Shamblin | 404/118 |
| 5,745,634 A | 4/1998 | Garrett et al. | 385/140 |
| 5,909,078 A | 6/1999 | Wood et al. | 310/307 |
| 5,915,063 A | 6/1999 | Colbourne et al. | 385/140 |
| 6,130,984 A | 10/2000 | Shen et al. | 385/140 |
| 6,137,941 A | 10/2000 | Robinson | 385/140 |
| 6,149,278 A | 11/2000 | Mao et al. | 359/862 |

(Continued)

FOREIGN PATENT DOCUMENTS

JP    2000243984 A    9/2000

OTHER PUBLICATIONS

Y. Soskind et.al., "High Dynamic Range Integrated 10 Gb/s Receiver", *Proc. SPIE Photonics Packaging and Integration VI*, vol. 5358, pp. 20-28, 2004.

(Continued)

*Primary Examiner*—Frank G. Font
*Assistant Examiner*—Charlie Peng
(74) *Attorney, Agent, or Firm*—Allen, Dyer, Doppelt, Milbrath & Gilchrist, P.A.

(57) ABSTRACT

A high dynamic range integrated (HDRI) receiver includes a variable optical attenuator (VOA) for attenuating an incoming optical signal before the optical signal is directed to a photo-detector for conversion into an electrical signal. An optical block receives the optical signal from an optical fiber and includes optics for directing the optical signal to the VOA, and for directing the optical signal from the VOA to the photo-detector.

20 Claims, 5 Drawing Sheets

U.S. PATENT DOCUMENTS

| | | | |
|---|---|---|---|
| 6,163,643 A | 12/2000 | Bergmann et al. | 385/140 |
| 6,275,320 B1 | 8/2001 | Dhuler et al. | 359/237 |
| 6,292,616 B1 | 9/2001 | Tei et al. | 385/140 |
| 6,317,233 B1 | 11/2001 | Son | 398/9 |
| 6,487,349 B2 | 11/2002 | Wach et al. | 385/115 |
| 6,493,478 B1 | 12/2002 | DeRosa et al. | 385/16 |
| 6,611,649 B2 | 8/2003 | Chan et al. | 385/140 |
| 6,636,683 B2 | 10/2003 | Morimoto et al. | 385/140 |
| 6,751,379 B2 * | 6/2004 | Capewell et al. | 385/36 |
| 6,754,431 B2 | 6/2004 | Sufleta et al. | 385/140 |
| 6,781,736 B2 | 8/2004 | Hoyt et al. | 359/256 |
| 6,782,185 B2 | 8/2004 | Katayama et al. | 385/140 |
| 7,157,687 B1 * | 1/2007 | Yao | 250/216 |
| 2001/0048794 A1 | 12/2001 | Nakaya et al. | 385/93 |
| 2002/0136524 A1 * | 9/2002 | Agha Riza | 385/140 |
| 2002/0158268 A1 | 10/2002 | Matsuda | 257/184 |
| 2003/0026583 A1 * | 2/2003 | Hoyt et al. | 385/140 |
| 2003/0223727 A1 | 12/2003 | Soskind et al. | 385/140 |
| 2003/0231828 A1 | 12/2003 | Brock et al. | 385/33 |
| 2004/0141710 A1 | 7/2004 | Kishida et al. | 385/140 |
| 2004/0174473 A1 | 9/2004 | Cavanaugh et al. | 349/96 |

OTHER PUBLICATIONS

W. K. Hogan et. al., "Low-Cost Optical Sub-Assemblies for Metro Access Applications", *Proc. 54th Electronic Components and Technology Conference, paper s05p4*, 2004, pp. 203-207.

http://www.lightconnect.com/products/voa.shtml.

* cited by examiner

HIGH DYNAMIC RANGE INTEGRATED RECEIVER

CROSS-REFERENCE TO RELATED APPLICATIONS

The present invention is a continuation in part of U.S. patent application Ser. No. 11/132,801 filed May 19, 2005 now U.S. Pat. No. 7,068,890, which is a divisional patent application of U.S. patent application Ser. No. 10/342,410 filed Jan. 13, 2003 now U.S. Pat. No. 6,954,580, which claims priority from 60/360,937 filed Mar. 1, 2002, and the present invention claims priority from U.S. patent application Ser. No. 60/714,654 filed Sep. 7, 2005, which are all incorporated herein by reference for all purposes.

TECHNICAL FIELD

The present invention relates to optical receivers with extended dynamic range, and in particular to optical receivers with an integrated optical attenuation function to achieve extended operational dynamic range.

BACKGROUND OF THE INVENTION

With the growth of optical communication systems there is a continuing demand for lower-cost, high-performance optical components with extended flexibility in operation. Component integration is a key technology that provides the benefits of lower costs and reduced sizes as compared to solutions based on discrete components.

The dynamic range of an optical receiver is limited at low optical input powers by the coupling loss and photo-detector sensitivity. At high optical input powers the dynamic range is limited by the overload parameters that reflect the saturation level of the associated electronics, such as a transimpedance amplifier (TIA). In practical network applications a variable optical attenuator (VOA) is placed before the receiver and is used to control the received optical power within a limited range, assuring optimum receiver performance. The VOA functionality can also be used for receiver overload protection when, due to the system overload, the input optical power levels exceed the receiver damage threshold.

From the above perspective, integration of variable attenuation and receiver functions makes perfect sense, providing convenient closed-loop attenuation control based on receiver feedback for instant overload protection or performance optimization. Existing High Dynamic Range Integrated (HDRI) receivers, such as the ones disclosed by Y. Soskind et.al., "High Dynamic Range Integrated 10 Gb/s Receiver", *Proc. SPIE Photonics Packaging and Integration VI*, Vol. 5358, pp. 20-28, 2004, provide integration benefits of improved performance, such as reduction in the total insertion loss, response time and optical components count.

Different types of optical attenuation mechanisms have been developed for VOA applications, including various types of Micro-Electro-Mechanical Systems (MEMS) structures, such as those disclosed in U.S. Pat. No. 6,782,185, entitled "Optical Variable Attenuator and Optical Module", issued Aug. 24, 2004; U.S. Pat. No. 6,754,431 entitled "Variable Optical Attenuator", issued Jun. 22, 2004; and U.S. Pat. No. 6,636,683 "Variable Optical Attenuator", issued Oct. 21, 2003, liquid crystal devices such as those disclosed in U.S. Pat. No. 6,781,736, entitled "Folded Liquid-Crystal Variable Optical Attenuator", issued Aug. 24, 2004; and U.S. Patent Applications Nos. 20040174473, entitled "Liquid crystal variable optical attenuator", published Sep. 9, 2004; and 20040141710, entitled "Variable Optical Attenuator", published Jul. 22, 2004; and waveguide structures such as those disclosed in U.S. Pat. No. 6,611,649, entitled "Variable Optical Attenuator with Polarization Maintaining Fiber", issued Aug. 26, 2003; U.S. Pat. No. 6,493,478, entitled "Photothermal Optical Switch and Variable Attenuator", issued Dec. 10, 2002; and U.S. Pat. No. 6,317,233, entitled "Optical Power Equalizer in WDM Optical Communication System and Variable Attenuator for Use Therein", issued Nov. 13, 2001.

MEMS actuation mechanisms constitute a group of reliable cost-effective components well suited for high volume fabrication and packaging. VOA schemes with MEMS actuators may employ beam blockers, such as those disclosed in U.S. Pat. No. 5,909,078, entitled "Thermal Arched Beam Microelectromechanical Actuators", issued Jun. 1, 1999, tilting mirrors, such as those disclosed in U.S. Pat. No. 6,754,431, entitled "Variable Optical Attenuator", issued Jun. 22, 2004; and U.S. Pat. No. 5,915,063, entitled "Variable Optical Attenuator", issued Jun. 22, 1999; and reflective diffractive structures, such as those disclosed on http://www.lightconnect.com/products/voa.shtml.

While designing an integrated product, receiver and VOA packaging considerations are equally important. Receiver packages performing O-to-E conversion typically employ optical and RF ports that oppose each other, See, for example, W. K. Hogan et. al., "Low-Cost Optical Sub-Assemblies for Metro Access Applications", *Proc. 54th Electronic Components and Technology Conference, paper s05p4*, pp. 203-207, 2004, making in-line VOA optical layouts well suited for receiver integration. Optical blockers are well suited for in-line VOA layout, as disclosed in U.S. Patent Application No. 20030223727, entitled "Optical receiver with high dynamic range", published Dec. 4, 2003 and assigned to JDS Uniphase Corporation, leading to small size implementation of HDRI receivers. FIG. 1 presents an optical layout of a conventional HDRI receiver with a beam blocking actuator. The output from the angle-polished input fiber 101 propagates through a ball lens 102 and is coupled to the active area 104 of a back-illuminated photo-detector 103. Thermally actuated beam blocker 105 is located in a divergent beam at a distance D from the input fiber 101. Lateral movement of the beam blocker 105 into the beam provides required attenuation, extending the dynamic range of the receiver.

Folded optical configurations are commonly employed to reduce the package size of discretely packaged VOAs using reflective MEMS devices. FIG. 2 presents a schematic optical layout of a conventional VOA employing a reflective actuator. The output from the input fiber 201 propagates through a collimating lens 202, is reflected by a VOA actuator 203 through the lens 202, and is coupled into an output fiber 204. When a reflective mirror is used in place of the VOA actuator 203, attenuation is achieved by changing the angular orientation of the mirror. When a diffractive structure is used in place of the VOA actuator 203, attenuation is achieved by adjusting the phase difference between interfering portions of the beam. To reduce the packaging cost and complexity of a VOA employing reflective actuators, both the input fiber 201 and the output fiber 204 are located on the same side of the VOA package, and are commonly sharing the package feed-through.

In some HDRI receiver applications; however, it is desirable to use reflective MEMS structures. Reflective electrostatic MEMS mirrors or diffractive structures require significantly lower actuation power as compared to that for thermally actuated beam blockers, and may be used when the HDRI power consumption is limited. Diffractive MEMS structures may also be used when attenuation response time of several tens of microseconds or less is required.

Integration of a reflective MEMS actuator into a receiver package requires the addition of optical components leading to an increase in packaging complexity, size and cost, as illustrated in FIG. 3. FIG. 3 presents a conventional optical layout of an HDRI Rx employing a reflective actuator 303 working on a collimated beam. Compared to the optical layout shown in FIG. 2, the optical layout in FIG. 3 employs an additional folding mirror 304 and a focusing lens 305, thereby increasing the component count. The output from an input fiber 301 propagates through a collimating lens 302, is reflected by the VOA actuator 303 and the folding mirror 304, propagates through the focusing lens 305, and is coupled to the photodetector 306. The folding mirror 304 introduces lateral placement offset of the photodetector 306, introducing asymmetry to the package and increasing its size. The focusing lens 305 contributes to an increase in packaging size and alignment complexity. The surfaces of the reflective VOA actuator 303 and the folding mirror 304 are oriented at an angle to the plane of the photodiode 306, adding to the packaging complexity. Integration of a reflective MEMS structure (as the VOA actuator 303) into the HDRI Rx comes with increased packaging size, complexity and cost.

There is a clear trade-off between the packaging complexity of the integrated receiver and the choice of the MEMS actuator used to achieve attenuation, i.e. a transmissive beam blocker or a reflective one.

An object of the present invention is to overcome the shortcomings of the prior art by providing a small sized and inexpensive HDRI Rx packaging solution with reduced complexity employing reflective MEMS VOA structures.

SUMMARY OF THE INVENTION

The present invention provides a HDRI Rx packaging solutions of reduced size and cost by combining the beam shaping and the beam redirecting functions into a single optical component. In the preferred solution the beam shaping and the beam-redirecting functions are integrated into a single optical component that can be easily fabricated, e.g. by plastic injection molding. Employment of a single optical component with fixed relation between the beam shaping and the beam redirecting optical surfaces significantly simplifies the HDRI Rx assembly process, in particular when the VOA structures and the photo-detector device are positioned adjacent one another on the same support structure.

The molded component may also combine mechanical mounting features and the above optical functions leading to simplified assembly process and further reduction in packaging complexity and production cost.

In another embodiment the dual-mirror arrangement is used to redirect the light reflected from the MEMS actuator towards the PD photosensitive area, reducing assembly sensitivity to angular misalignments.

Accordingly, the present invention relates to a receiver optical subassembly (ROSA) comprising:
an input port for receiving an end of an optical waveguide, which launches an optical beam having a light intensity and including an optical signal;
a variable optical attenuator (VOA) mechanism for attenuating the light intensity of the optical beam;
a photo-detector for converting the optical signal into an electrical signal; and optical coupling means comprising an optical block for receiving the optical beam from the optical waveguide through a first input surface, wherein the optical block includes optics for directing the optical beam to the VOA mechanism, for receiving the optical beam from the VOA mechanism through a second input surface, and for directing the optical beam to the photo-detector.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
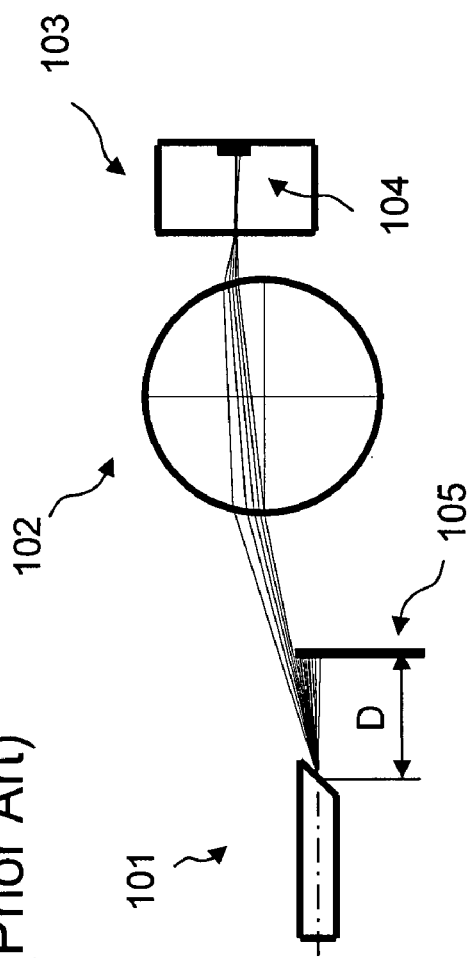
FIG. 1 illustrates a conventional inline optical layout of an HDRI receiver with a beam blocking actuator.
Figure 2:
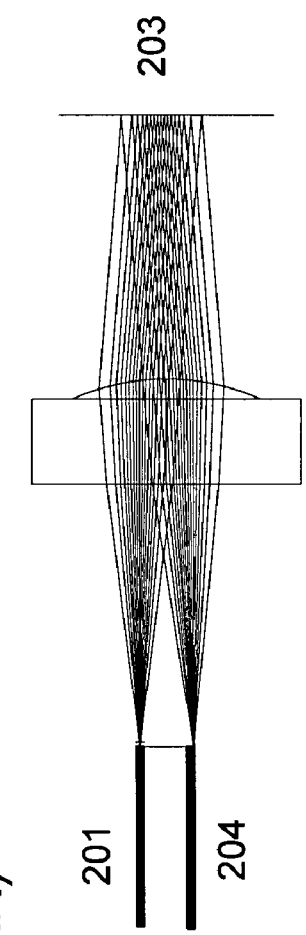
FIG. 2 illustrates a conventional folded optical layout of an VOA employing a reflective actuator.
Figure 3:
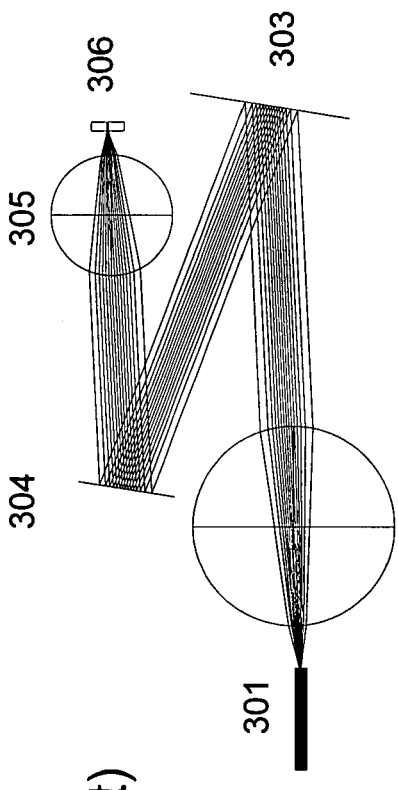
FIG. 3 illustrates a conventional optical layout of an HDRI receiver employing a reflective actuator and an additional folding mirror.
Figure 4:
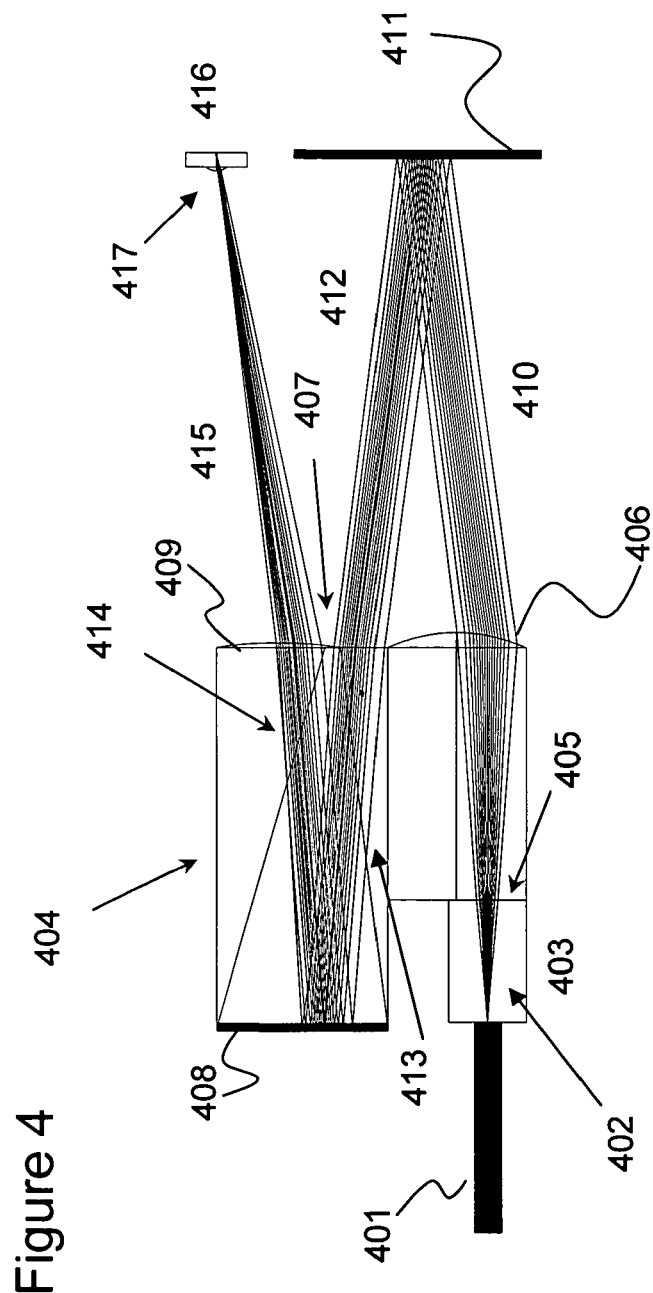
FIG. 4 illustrates an inline optical layout of an HDRI receiver employing a reflective actuator in accordance with a first embodiment of the present invention.

FIG. 4 illustrates an inline optical layout of an High Dynamic Range Integrated (HDRI) receiver employing a reflective variable optical attenuator (VOA) actuator 411 in accordance with a first embodiment of the present invention. A diverging beam 402 launched from an input fiber 401, defining an input port, propagates through a silica block 403 placed in optical contact with the end-face of input fiber 401, and enters the monolithic optical block 404 through an input port defined by a first input planar surface 405, which is also in optical contact with the silica block 403. The silica block 403 has an index of refraction in between that of the input fiber 401 and the optical block 404 providing a gradual transition therebetween for minimizing back reflections from interfaces therebetween. The monolithic optical block 404 integrates five optical interfaces including: in the order of the beam propagation, an input planar surface 405, a collimating lens surface 406, a planar refractive surface 407, a planar reflective surface 408, and a focusing lens surface 409. The diverging beam 402 is collimated by the lens surface 406 forming collimated beam 410, which is directed towards a reflective VOA actuator mechanism 411. A reflected beam 412, which is reflected by the VOA actuator mechanism 411, including at least a portion of the collimated beam 410 is refracted through the planar refractive surface 407 forming beam 413, reflected by the planar reflective surface 408 forming beam 414, and exits the optical block 404 through the focusing lens surface 409 forming a converging beam 415. The converging beam 415 is directed towards the photodetector 416 and is coupled to the active area therein. The photodetector 416 may include optics in the form of a lens formed on the front surface 417. Ideally, the VOA actuator mechanism 411 and the photo-detector 416 are mounted on the same support structure (see FIG. 7) to facilitate assembly with the optical block 404. In the preferred embodiment the optical block 404 is formed from an optical polymer material by using an injection-molding technique. The planar reflective surface 408 is coated with a high-reflectivity coating. The adjacent optical interfaces 406, 407 and 409, which are in contact with air, may be coated with anti-reflection coating, while the interface 405 may be coated with a coating index matched to the block 403, reducing insertion loss of the system as well as the optical feedback into the input fiber 401. Alternatively, the planar reflective surface 408 may be replaced by other optics, such as a roof-type double-surface arrangement that effectively serves as a retro-reflector and has lower misalignment sensitivity as compared to the single planar mirror. The retro-reflector may make use of the TIR (total internal reflection) eliminating the need for an application of coatings to the mirror surfaces. Accordingly, the optical block provides a means for coupling the input beam 402 from the input port to the photo-detector 416 via a VOA mechanism 411 including reflective surfaces and lenses for redirecting the light within a small ROSA package.

Figure 5:
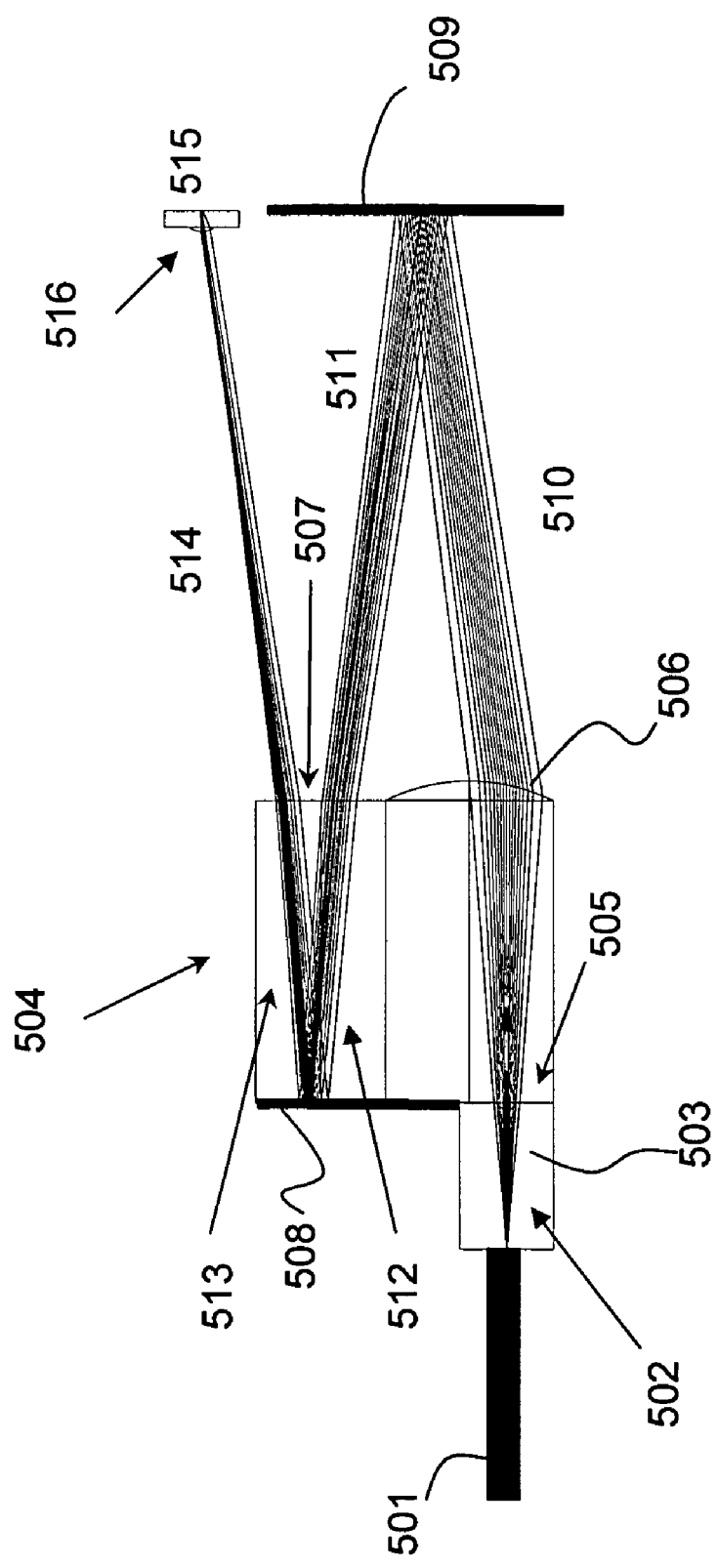
FIG. 5 illustrates an inline optical layout of HDRI receiver employing a reflective actuator in accordance with a second embodiment of the present invention.

FIG. 5 illustrates an inline optical layout of an HDRI receiver employing a reflective VOA actuator 509 in accordance with a second embodiment of the present invention. A diverging optical beam 502 launched from an input fiber 501 propagates through a silica block 503, placed in optical contact with an end-face of the fiber 501, and enters a monolithic optical block 504 through an input port in the form of a first input planar surface 505, which is also in optical contact with the silica block 503. The monolithic optical block 504 integrates four optical interfaces including: in order of beam propagation, an input planar surface 505, a coupling lens surface 506, a planar refractive surface 507, and a planar reflective surface 508. The diverging beam 502 is refracted by the lens surface 506 forming a converging beam 510, which is directed towards the reflective VOA actuator 509 forming a reflected beam 511, i.e. an attenuated beam that includes at least a portion of the converging beam 510. The reflected beam 511 is refracted through the planar refractive surface 507 forming beam 512, reflected at the planar reflective surface 508 forming beam 513, and exits the optical block 504 through the planar refractive surface 507 as beam 514. The beam 514 is directed towards the photo-detector 515, and is coupled to an active area thereof. Preferably, the coupling lens 506 is provided with a focal length for focusing the optical beam onto the photo-detector 515. The photo-detector 515 may include an optional lens formed on a front surface 516 thereof. Ideally, the VOA actuator 509 and the photo-detector 515 are mounted on the same support structure (see FIG. 7) to facilitate assembly with the optical block 504. In the preferred embodiment the optical block 504 is formed from optical polymer material by using an injection-molding technique. The reflective surface 508 is coated with a high-reflectivity coating. The optical interfaces 506 and 507 may be coated with anti-reflection coating, while the interface 505 may be coated with index matched coating to the silica block 503, reducing insertion loss of the system as well as the optical feedback into the input fiber 501. Alternatively, the reflective surface 508 may be replaced by other optics, such as a roof-type double-surface arrangement that effectively serves as a retro-reflector and has lower misalignment sensitivity as compared to the single planar mirror. The retro-reflector may make use of the TIR (total internal reflection) eliminating the need for an application of coatings to the mirror surfaces.

Figure 6:
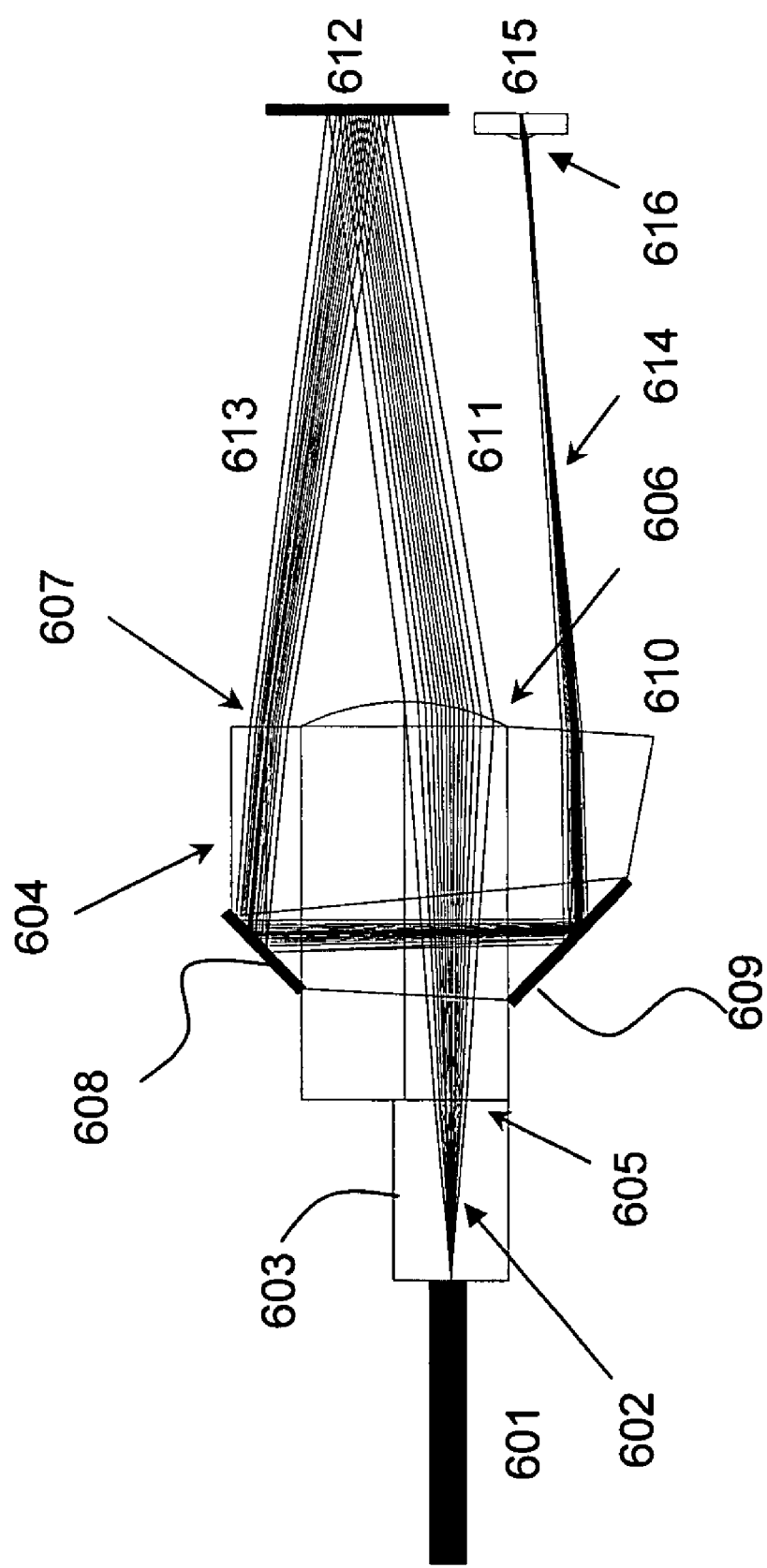
FIG. 6 illustrates an inline optical layout of an HDRI receiver employing a reflective actuator in accordance with a third embodiment of the present invention.

FIG. 6 illustrates an inline optical layout of an HDRI receiver employing a reflective VOA actuator 612 in accordance with a third embodiment of the present invention. A diverging beam 602, launched from an input fiber 601, propagates through a silica block 603, placed in optical contact with an end-face of the optical fiber 601, and enters a monolithic optical block 604 through an input port defined by a first input planar surface 605, which is also in optical contact with the silica block 603 for the aforementioned reasons. The monolithic optical block 604 integrates six optical interfaces including in order of beam propagation: the first input planar surface 605, a coupling lens surface 606, a second input planar (refractive) surface 607, first and second planar reflective surfaces 608 and 609, and an output planar refractive surface 610. The diverging beam 602 is refracted by the lens surface 606 forming a converging beam 611, which is directed towards the reflective VOA actuator 612 forming a reflected beam 613, which includes at least a portion of the converging beam 611. The reflected beam 613 is refracted through the second input planar (refractive) surface 607, reflected by the first and second reflective surfaces 608 and 609, and exits the optical block 604 through the planar refractive surface 610 as an output beam 614. The first and second reflective surfaces 608 and 609 are disposed at an acute angle, e.g. from 40° to 50°, to the incoming beams, and substantially perpendicular, e.g. from 80° to 100°, to each other on opposite sides of the optical block 604 between the first input surface 605 and the coupling lens surface 606, for redirecting the beam 613 from one side of the converging beam 611 into output beam 614 on an opposite side of the converging beam 611. The first and second reflective surfaces 608 and 609 can be optical coatings coated onto angled or beveled edges of the optical block 604. The output beam 614 is directed towards a photo-detector 615, and is coupled to an active area thereof. Preferably, the coupling lens 606 is provided with a focal length for focusing the optical beam onto the photo-detector 615. The photo-detector 615 may include an optional lens formed on a front surface 616 thereof. Ideally, the VOA actuator 612 and the photo-detector 615 are mounted adjacent one another on the same support structure (see FIG. 7) to facilitate assembly with the optical block 604. In the preferred embodiment the optical block 604 is formed from optical polymer material by using an injection-molding technique. The reflective surfaces 608 and 609 may not require application of reflective coatings and have high reflectivity due to the TIR (total internal reflection) of the beam exceeding the critical angle inside the optical block 604. The adjacent optical interfaces 606, 607 and 610 may be coated with anti-reflection coating, while the interface 605 may be coated with a coating index matched to the silica block 603, thereby reducing insertion loss of the system as well as the optical feedback into the input fiber 601.

Figure 7:
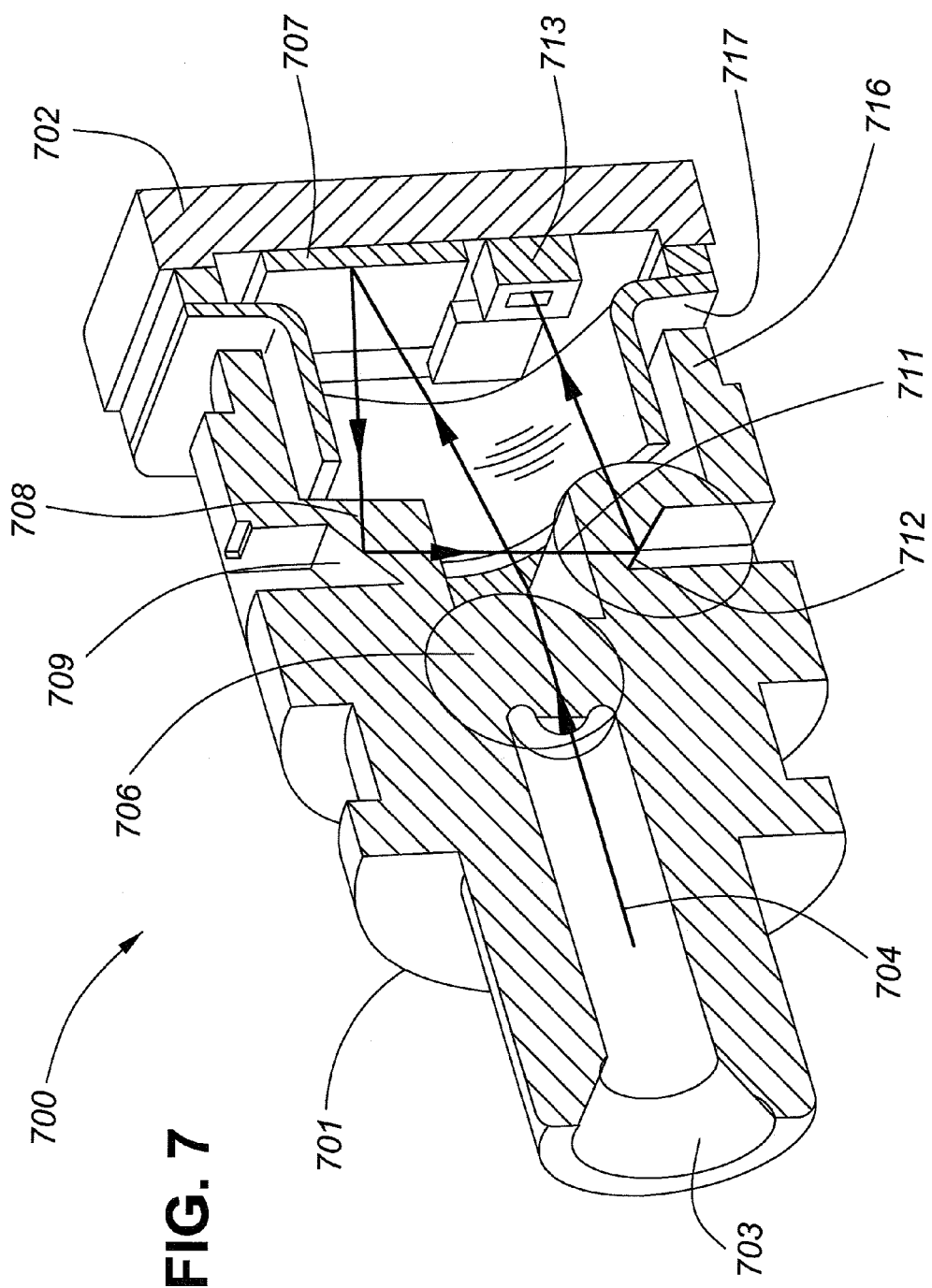
FIG. 7 illustrates a solid model cross-section of an HDRI receiver employing a reflective actuator in accordance with a fourth embodiment of the present invention.

FIG. 7 illustrates a solid model cross-section of a HDRI receiver for use in a receiver optical subassembly (ROSA) 700. The ROSA 700 includes a monolithic optical block front end 701 and a square electrical base 702. An optical connector 703, forming an input port, extends from the optical front end 701 for receiving a ferruled end of an optical fiber (not shown), which launches a diverging optical beam 704 into the ROSA 700. A lens 706, which is integrally formed in the optical block front end 701, receives the optical beam through a first input surface and directs the beam 704 onto a VOA reflective actuator 707. A silica block (as above) can be provided within the optical connector 703 for index matching the optical fiber or for providing an index transition between the fiber and the lens 706 by having an index of refraction between that of the fiber and the lens 706. The VOA 707 in turn directs the attenuated beam 704, i.e. at least a portion of the input beam, through a second input (refractive) surface 708, and off of a first reflective surface 709. The beam 704 then temporarily exits the optical block 701, in front of the lens 706, i.e. between the lens 706 and the base 702, and reenters the optical block 701 through a third input (refractive) surface 711. A second reflective surface 712 is arranged to reflect the optical beam 704 towards a photo-detector 713. Preferably, the lens 706 is provided with a focal length for focusing the optical beam onto the photo-detector 713. The first and second reflective surfaces 709 and 712 are disposed at an acute angle, e.g. from 40° to 50°, to the incoming beams, and substantially perpendicular to each other, i.e. 80° to 100° apart, on opposite sides of the optical block 701 for redirecting the beam 704 from one side of the lens 706 to an opposite side thereof. The first and second reflective surfaces 709 and 712 can be coated with a suitable reflective coating or can rely on other optics, such as TIR as hereinbefore described. The photo-detector 713 and the VOA reflective actuator 707 are mounted adjacent one another on the electrical base 702, which forms the base for the ROSA 700. Suitable electrical connections extend through the base 702 for electrically connecting the ROSA 700 to a module printed circuit board (not shown) for transmitting electrical signals therebetween. An annular mounting ring 716 extends from the rear of the optical block front end 701 for mating with an annular portion of a connector 717 extending from the base 702. The connector 717 also includes a square portion for mounting on the base 702 and a transition portion between the square and annular portions. The mounting ring 716 and the connector 717 are fixed together using a suitable adhesive. In the preferred embodiment the front end 701, including the optical connector 703 and the mounting ring 716, is integrally formed from an optical polymer material by using an injection-molding technique.

Accordingly, the optical block provides a means for coupling the input beam 704 from the input port to the photo-detector 713 via a VOA mechanism 707 including reflective surfaces and lenses for redirecting the light within a small ROSA package.

The present invention does not simply combine existing means, such as a VOA device (with coupling/packaging means) and a ROSA (with respective coupling/packaging means) with foreseen results, such as extension of a dynamic range of the above combination. Within the scope of our ROSA invention we are integrating a photo-detector, an attenuation mechanism and coupling and beam forming means in a single device with the net reduction in the number of coupling components, coupling losses and package size as compared to a combination of a VOA and a ROSA as two independent devices.

While this invention has been particularly shown and described with references to preferred embodiments thereof, it will be understood by those skilled in the art that several other variances of the presented HDRI receiver design can be constructed without departing from the scope of the invention.

We claim:

1. A receiver optical subassembly (ROSA) comprising:
   an input port for receiving an end of an optical waveguide, which launches an optical beam having a light intensity and including an optical signal;
   a variable optical attenuator (VOA) mechanism for attenuating the light intensity of the optical beam;
   a photo-detector for converting the optical signal into an electrical signal; and
   optical coupling means comprising an optical block for receiving the optical beam from the optical waveguide through a first input surface,
   wherein the optical block includes optics for directing the optical beam to the VOA mechanism, for receiving the optical beam from the VOA mechanism through a second input surface, and for directing the optical beam to the photo-detector;
   wherein the optics includes a first lens on a first output surface of the optical block for directing the optical beam onto the VOA mechanism; and
   wherein the first lens has a focal length for focusing the optical beam onto the photo-detector.

2. The ROSA according to claim 1, wherein the optics include at least one reflective surface on the optical block for redirecting the optical signal from the VOA mechanism to the photo-detector.

3. The ROSA according to claim 2, wherein at least one of the reflective surfaces relies on total internal reflection of the optical beam exceeding the critical angle inside the optical block.

4. The ROSA according to claim 1, wherein the optics includes first and second reflective surfaces for redirecting the optical beam from the VOA mechanism onto the photo-detector.

5. The ROSA according to claim 4, wherein the first and second reflective surfaces are disposed on opposite sides of the optical block substantially perpendicular to each other.

6. The ROSA according to claim 4, wherein at least one of the first and second reflective surfaces relies on total internal reflection of the optical beam exceeding the critical angle inside the optical block.

7. The ROSA according to claim 1, wherein the optics includes a first lens on a first output surface of the optical block for directing the optical beam onto the VOA mechanism.

8. The ROSA according to claim 7, wherein the optics includes first and second reflective surfaces for redirecting the optical beam from the VOA mechanism onto the photo-detector; wherein the first and second reflective surfaces are disposed on opposite sides of the first lens substantially perpendicular to each other.

9. The ROSA according to claim 1, wherein the VOA mechanism comprises a reflective device for attenuating the intensity of the optical beam, and for redirecting at least a portion of the optical beam back towards the optical block.

10. The ROSA according to claim 9, wherein the VOA mechanism and the photo-detector are mounted adjacent one another on a base.

11. The ROSA according to claim 1, wherein the VOA mechanism and the photo-detector are mounted adjacent one another on a base.

12. The ROSA according to claim 1, wherein the optical block further includes an optical coupler for receiving a ferruled end of an optical fiber.

13. The ROSA according to claim 1, wherein the optical block comprises an optical polymer material molded into a monolithic structure.

14. The ROSA according to claim 1, further comprising an index matching block between the input port and the optical block, having an index of refraction between the optical waveguide's index of refraction and the optical block's index of refraction.

15. The ROSA according to claim 1, wherein the optical block further includes a mounting ring for connecting the base to the optical block at an opposite end thereof to the input port.

16. A receiver optical subassembly (ROSA) comprising:
an input port for receiving an end of an optical waveguide, which launches an optical beam having a light intensity and including an optical signal;
a variable optical attenuator (VOA) mechanism for attenuating the light intensity of the optical beam;
a photo-detector for converting the optical signal into an electrical signal; and
optical coupling means comprising an optical block for receiving the optical beam from the optical waveguide through a first input surface,
wherein the optical block includes optics for directing the optical beam to the VOA mechanism, for receiving the optical beam from the VOA mechanism through a second input surface, and for directing the optical beam to the photo-detector;
wherein the optics includes first and second reflective surfaces for redirecting the optical beam from the VOA mechanism onto the photo-detector;
wherein the first and second reflective surfaces are disposed on opposite sides of the first lens substantially perpendicular to each other;
wherein the optics includes a first lens on a first output surface of the optical block for directing the optical beam onto the VOA mechanism; and
wherein the first and second reflective surfaces are disposed between the first lens and the photo-detector, whereby the optical beam exits and reenters the optical block between the first and second reflective surfaces.

17. The ROSA according to claim 11, wherein the first lens has a focal length for focusing the optical beam onto the photo-detector.

18. A receiver optical subassembly (ROSA) comprising:
an input port for receiving an end of an optical waveguide, which launches an optical beam having a light intensity and including an optical signal;
a variable optical attenuator (VOA) mechanism for attenuating the light intensity of the optical beam;
a photo-detector for converting the optical signal into an electrical signal; and
optical coupling means comprising an optical block for receiving the optical beam from the optical waveguide through a first input surface,
wherein the optical block includes optics for directing the optical beam to the VOA mechanism, for receiving the optical beam from the VOA mechanism through a second input surface, and for directing the optical beam to the photo-detector; and
wherein the optical block further includes a mounting ring for connecting the base to the optical block at an opposite end thereof to the input port.

19. The ROSA according to claim 14, wherein the first lens collimates the optical beam onto the VOA; and wherein the optical block further comprises a second lens on a second output surface for focusing the optical beam onto the photodetector.

20. The ROSA according to claim 18, wherein the first lens has a focal length for focusing the optical beam onto the photo-detector.

* * * * *